United States Patent
Manoharan

(10) Patent No.: US 6,793,841 B2
(45) Date of Patent: Sep. 21, 2004

(54) MAGNETO-RESISTIVE CRO2 POLYMER COMPOSITE BLEND

(75) Inventor: Solomon Sundar Manoharan, Kanpur (IN)

(73) Assignee: Indian Institute of Technology, Kanpur (IN)

(*) Notice: Subject to any disclaimer, the term of this patent is extended or adjusted under 35 U.S.C. 154(b) by 61 days.

(21) Appl. No.: 09/829,414

(22) Filed: Apr. 9, 2001

(65) Prior Publication Data

US 2002/0065349 A1 May 30, 2002

(30) Foreign Application Priority Data

Oct. 13, 2000 (IN) .................................................. 934/00

(51) Int. Cl.$^7$ .............................................. H01F 1/28
(52) U.S. Cl. .......................... 252/62.54; 252/62.51 C; 524/407; 524/435; 524/431
(58) Field of Search .................................. 524/407, 435, 524/431; 252/62.51 C, 62.54

(56) References Cited

U.S. PATENT DOCUMENTS 3,558,492 A * 1/1971 Proskow ..................... 360/134

* cited by examiner

Primary Examiner—C. Melissa Koslow
(74) Attorney, Agent, or Firm—Ladas & Parry

(57) ABSTRACT

A magneto-resistive $CrO_2$ polymer composite blend comprising 90–95% by weight of the polymer preferably Low Density Poly Ethylene, 5–10% by weight of magnetic filler preferably $CrO_2$ and 2–4% by weight of an additive, prepared by the process of mixing the said polymer, said $CrO_2$ and said additive in a mortar pestle to obtain a homogenous mixture, the said mixture is heated at a temperature of 95–100° C. to obtain a blended melt, the said blended melt is then casted between two metal plates to obtain sheets by applying the pressure.

2 Claims, 5 Drawing Sheets

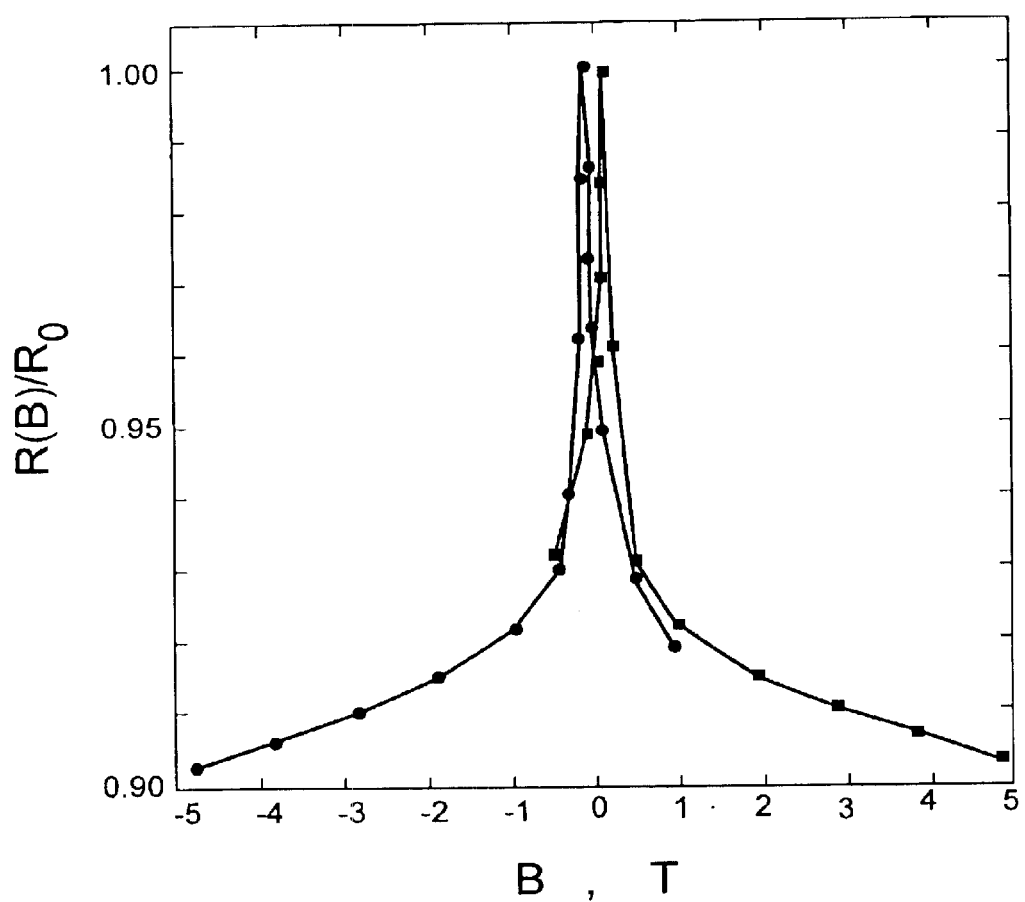
F I G. 3a

MAGNETO-RESISTIVE CRO2 POLYMER COMPOSITE BLEND

FIELD OF INVENTION

The subject invention relates to a magneto-resistive $CrO_2$ polymer composite blend for use in magnetic storage devices, such as in audio and video tapes, magnetic read heads, magnetic field probes, or current voltage sensors in electrical devices and the process for preparation of the same to provide a matrix for conducting and magnetic fillers to form a blend which in turn shows the desired magneto-resistive property.

The present invention also resides in the process for the preparation of a magneto-resistive polymer composite blend comprising a polymer, preferably Low Density Poly Ethylene (LDPE), the ferromagnetic filler preferably Chromium Oxide capable of exhibiting magnetic properties and an additive preferably conducting carbon brings about magneto-resistive properties in the composite.

The embodiment of the invention resides in the fabrication of the conducting polymer blend which would mimic the properties of ferromagnetism and metallic conductivity of the bulk $CrO_2$ and to characterize its electrical property in the presence of an external magnetic field.

BACKGROUND OF THE INVENTION

Prior Art

Materials exhibiting magnetoresistance ratio greater than a few percent are useful in a variety of devices. The devices utilize the magnetoresistive materials' ability to respond, by way of resistive changes, to small changes in applied magnetic field. This effect is useful, for example, in magnetic sensing devices, current sensing devices, memory elements, or even acoustic devices. Examples of useful devices are discussed, for example, U.S. Pat Nos. 5,450,372 and 5,461,308.

K. Chanhara et al., Applied Physics Letters, Vol 63 (14), at 1990; R Von Helmholt et al., Physical Review Letters Vol. 71 (14) at 2331; and U.S. Pat. Nos. 5,549,977 and 5,538,800 teach that desirable MR has been observed in mixed metal oxides, e.g. La—Ca—Mn—O, La—Ba—Mn—O and La—Sr—Mn—O. The magneto resistance of La—Sr—Mn—O perovskites, appears to be better in polycrystalline samples, as opposed to single crystals, possibly due to spin-polarized tunneling of electrons between grains.

H. Y. Hwang et al., Physical Review Letters, Vol. 77 (10), at 2041 teaches in particular, it has been found that trilayer structures using La—Ca—Mn—O and La—Sr—Mn—O perovskites undergo a change in resistance by a factor of 2 in a low applied field of 200 Oe, indicating the potential use of such materials in field sensors. Se J. Z. Sun et al. Appl. Phys. Lett., Vol. 69 (21). 3266. In (U.S. Pat. No. 5,856,008), Cheong et al teaches that in a bulk polycrystalline CrO2 material shows low temperature magneto-resistance ratio of 6% at 5 K at 20 kOe. The materials is synthesized by carefully incorporating insulating grains of $Cr_2O_3$ between ferromagnetic clusters of $CrO_2$ grains. By introducing conducting barrier between grains, the MR ratio is increased. Electron can hop between grains provided the moment of each grain is aligned parallel to each other. However it is noted that the grains are usually mis-aligned, as a result the resistance at low temperatures. Other examples of suitable devices that rely upon a magnetoresistive material are discussed, for example, U.S. Pat. Nos. 5,450,372 and 5,461, 308, referenced above, as well as U.S. Pat. Nos. 5,422,571; 5,565,695, 5,432,373, 5,541,868.

A new property such as magneto-resistance was realized in $CrO_2$ recently. This property exhibits a large drop in resistance on application of an external field. The sensitivity with which it can change its resistance in the presence of an applied magnetic field determines whether this compound could be used as magnetic sensors.

Such magneto-resistive features have been exemplified in a variety of compounds which includes ferromagnetic Fe and Co based alloys, rare earth manganites. While, alloys exhibit this property in thin film configuration when stacked as magnetic and non-magnetic layers, manganites show such drop in resistance both in bulk and as thin films. This property if realized as a polymer, it can be exploited in a variety of applications due to ease of processing such a compound to any desired size and shape. This challenge therefore lies on the design of a polymer blend which can show such unique magneto-resistive behavior.

Electrically conducting polymer composite materials exhibiting positive temperature coefficient of resistance effect have been in use in resistance switching devices for many years. These materials are characterized by a switch temperature at which the material resistivity changes by orders of magnitude. The most studied polymer composite system which exhibits this effect consists of polyethylene loaded with carbon black. At temperatures below 130° C., i.e. below the melting point of polyethylene there is an anomalous resistance which raises by orders of magnitude. This increase in resistance is believed to be due to the increased carbon black particle separation which forms a discontinuous polyethylene phase expansion. Upon meting, conducting polymer composite materials have been realized in co-polymer blends too, such as polyethylene-polystyrene copolymers wherein conducting fillers such as carbon black can bring about electrical percolation at doping levels below 3 wt %. As a result, a co-polymer which otherwise shows a resistance of the order of MOhms, shows below 1000 Ohms when doped with conducting filler such as carbon black. This aspect in particular is used in sensor technology.

Conducting polymer composite materials consisting of a random distribution of a conducting filler throughout an insulating polymer are of interest for several applications. $CrO_2$ being an important electronic material finds application as a recording material owing to its unique property of being ferromagnetic and metallic at room temperatures. Studies on $CrO_2$ are limited owing to its thermal instability. The compound decomposes above 300° C. which limits its application. The key tools in the design of a $CrO_2$ based polymer blend are in appropriate polymer and selective localization of $CrO_2$ grains in the blend. The best way to fabricate such a composite is to selectively disperse the $CrO_2$ conducting chain with the filler in the insulating polymer matrix so that it forms a current conducting chain with the filler concentration as low as possible. An essential prerequisite for technological application is to retain the aciculate nature of the $CrO_2$ grains during composite processing.

The object of the present invention is to improve the conductivity between the $CrO_2$ grains embedded in a highly insulating polymer phase by adding an additive. The proportion of this additive in the polymer:$CrO_2$:additive ratio varies from 3–10 wt %. Percolation between the $CrO_2$ grains is achieved even with 3% of this additive.

However a nominal composition of >3% is always preferred to keep the material below 100 Ohms. As a result of effective percolation between the magnetic $CrO_2$ particles through a conducting additive network the response of the $CrO_2$-polymer blend can be measured by applying an external magnetic field.

Chromium (iv) oxide, $CrO_2$ is known for its unique application as a tape material. It is a metal and at room temperature Ferro-magnet having a Curie Temperature of 385° K and at T=0K, it's a half metallic Ferro-magnet. This oxide is hydro-thermally prepared and has fine grained needles with acicular shape, a feature desired for magnetic storage applications.

BRIEF SUMMARY OF THE INVENTION

Accordingly the present invention relates to a magneto-resistive $CrO_2$ polymer composite blend that can be made into a film or artefact for use in magnetic storage devices such as audio and video tapes, magnetic read heads, magnetic field probes or current voltage sensors in electrical devices, comprising:

88%–93% w/w of low density polyethylene;
5–8% w/w of $CrO_2$; and
2–4% w/w carbon black.

The said polymer, preferably low density polyethylene is having a mesh size 200 micron and 99.9% purity and the said magnetic filler is in the form of powder.

The polymer composite blend is having the melting temperature of about 95° C.

The invention also resides in the process for the preparation of a magneto-resistive $CrO_2$ polymer composite blend, comprising mixing the said polymer, said $CrO_2$ and said additive as conducting carbon in a mortar pestle to obtain a homogenous mixture heating the said homogenous mixture at a temperature of 95–100° C. to obtain a blended melt casting the said melt between two metal plates to obtain sheets by applying uniaxial pressure.

The pressure applied to obtain the said sheet is in the range of from 4–5.5 KPa.

Alternatively in the process for the preparation of a magneto-resistive polymer composite blend, the said polymer, said $CrO_2$ and said additive were mixed to obtain a homogenous mixture, the said homogenous mixture is transferred into a die to obtain a pellet by applying a pressure of 4.5–5.5 KPa. The pellet so obtained is placed in a metallic mould and kept in a preheated hot press machine to allow the said polymer to melt at a pressure of 4–5.5 KPa and flow into thick sheet. The said mould is then cooled to obtain a film having magnetic properties.

The said mould used in the subject invention is preferably made up of aluminum and said hot press machine is uniaxial hot press machine The size of the said films so produced varies from 10 mm to 25 mm in diameter depending on the size of the powder compact of the mixture.

The subject application may better be understood with reference to accompanying drawings. However, the same should not be construed to restrict the scope of the application as they are for illustrative purposes only.

BRIEF DESCRIPTION OF THE ACCOMPANYING DRAWINGS

DETAILED DESCRIPTION OF THE INVENTION

Figure 1:
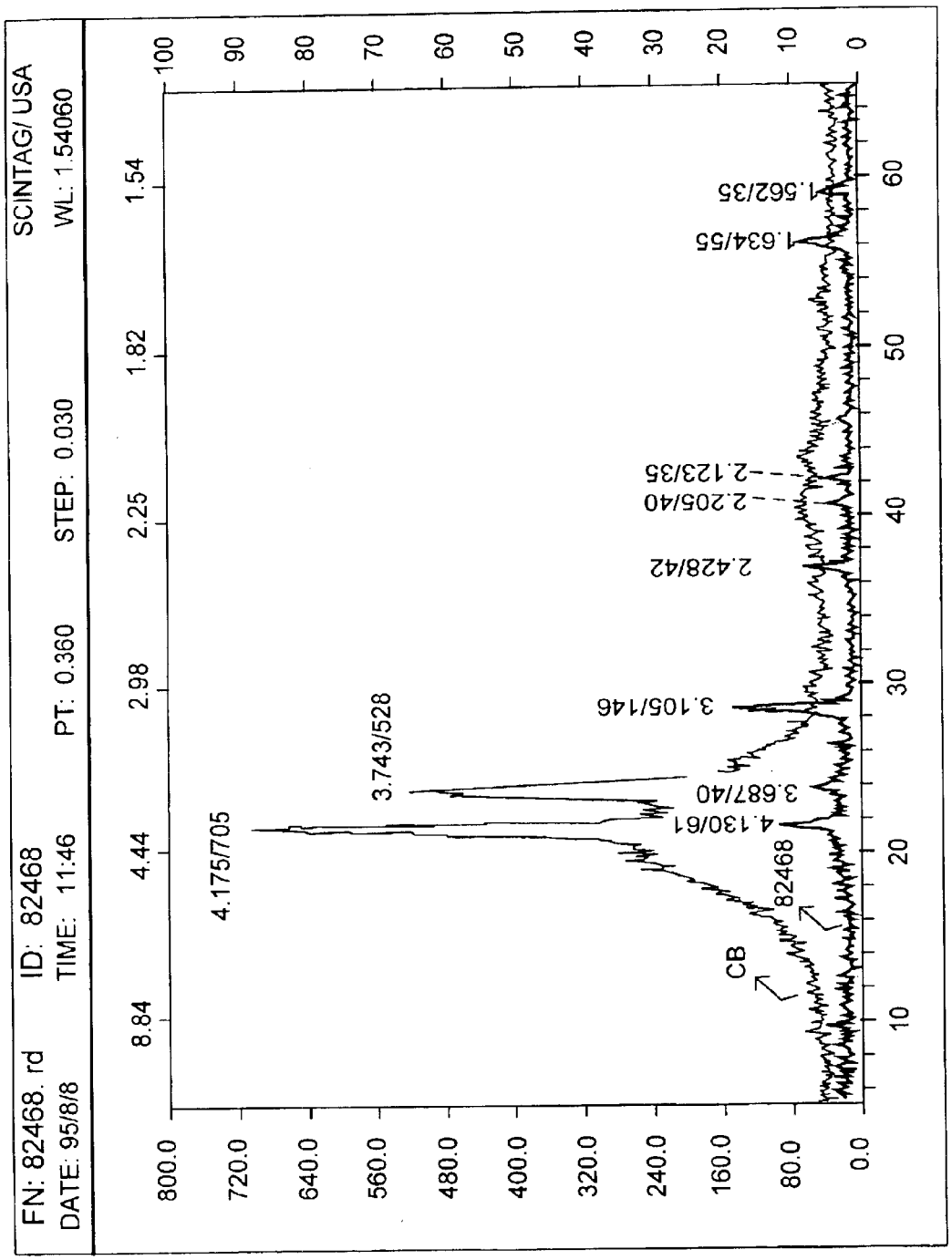
FIG. 1 depicts the X-ray diffractogram of the $CrO_2$ polymer blend which shows magneto-resistive properties.

The invention describes a process in which a magneto-resistive material is embedded in a highly insulating polymer matrix and effective percolation between the $CrO_2$ grains is achieved by adding another additive which has ability to bring about electrical percolation between the magneto-resistive material. The magneto-resistive material, in the presence of an external magnetic field shows a unique drop in resistance of about 11% at 5 K and at 5 Tesla. The nature of such magneto-resistance is exemplified in FIGS. 4(a–c). The magneto-resistance ratio is defined as $\Delta R/R_H$.

The subject invention brings about a novel aspect of granular magneto-resistive system in which a polymer plays a role of a insulating matrix and the filler $CrO_2$, which is ferromagnetic and a metal behaves just as a bulk $CrO_2$, even with a composition of 10–20% by weight in 80–90% of the polymer.

The polymer used in the subject invention preferably is LDPE having commercial grade purity of 99.9% having a melting point of 130° C. To make a polymer blend, the physical mixture of the polymer, $CrO_2$ and an additive is fed into a Brabender to make a melt at 95–100° C. The melt is then casted between two metal plates and drawn into sheets by applying a pressure of up to 5 Kpa.

Useful compositions include those which melt at 95° C. under a pressure of 5 kPa.

In an another embodiment, the polymer blend may be made by placing a powder compact of 5 mm and thickness of 3 mm in a metallic mould. The mould so used is preferably made up of aluminum. The metallic mould is then kept in a uniaxial hot press machine maintained previously at a set temperature of 95° C. The polymer melts and flows into the thick sheet, on applying the desired pressure. The pressure so applied is up to 5 Kpa. The mould is kept at the desired pressure for about 5 minutes and then the pressure is allowed to release. The mould then is removed from the said hot press and is allowed to cool. The film so obtained in the polymer blend which is black, glossy and about 8–11 mm in dia.

The thickness and the size of the blend can be varied depending upon the die used, amount of material taken and the size of the pellet taken.

The weight percentage composition can be varied as follows:

| Polymer | $CrO_2$ | Additive |
| --- | --- | --- |
| 90% | 7% | 3% |
| 85% | 11% | 4% |
| 80% | 15% | 5% |
| 80% | 12% | 8% |

The additive, typically carbon black, is conveniently used in the form of a powder.

The additive used is acetylene carbon which is a conducting form of carbon. The additive by itself does not show magneto-resistive property but performs only the act of providing percolation between magnetic grains. Percolation could be achieved with a minimum weight percentage of about 3%. Two probe resistance measurements show a resistance in 300K Ohms range for 3% additive. 5–8% additive was found to be conducive for the magneto-resistance measurements.

The mechanism of magneto resistance follows that the $CrO_2$ grains of the magneto resistive material tends to be fully spin polarized within each grain, meaning that the electrons in a single grain have the same spin orientation, but the spin orientation of the electrons in adjacent grain will typically be different. In order words the transfer integral, $t_{ij} \approx \cos \theta_{ij}$, where i and j are the grains aligned by an angle, theta θ.

The extent of intergrain electron transport in a material is highly dependent on the spin orientation of electrons in adjacent grains. It is relatively difficult for an electron of a certain spin orientation to move across the grains of a material when all the successive grains have electrons of different spin orientation. Upon application of the magnetic field to some spin polarized materials, at least some of the grains will arrange themselves such that their electrons can have the similar spins. The granular polarization makes electron transport across successive grains easier and thereby cause the resistivity of the material to decrease. This relationship between applied magnetic field and resistance is magneto-resistance.

In the subject invention, the presence of insulating polymer as a major phase in the polymer blend acts as the insulating barrier providing magnetic decoupling between adjacent grains of the $CrO_2$. The insulating barrier however can be overcome with another additive such as Carbon black which provides percolation between these grains. As a result a conducting thread is established. The desirable magneto-resistance offered by $CrO_2$ grains is reflected hence by FIGS. 4a–c.

The subject invention employs the ability of the polymer blend to respond by way of resistive changes to small changes in applied magnetic field. Examples of article include sensor devices such as a magnetic read heads, magnetic field probes, or current voltage sensors in electrical devices.

FIG. 1 shows the X-ray diffractogram of the $CrO_2$ polymer blend. The first curve marked CB, shows the X-ray pattern of the additive alone. The curve marked 82468, denotes the $CrO_2$-polymer blend. The X-ray reflections correspond to both the additive and bulk $CrO_2$. The weakly intense peak with d values of 4.130 and 3.687 Angstrom denote the presence of the additive CB. The other reflections shown in FIG. 1 are due to $CrO_2$.

Electron photomicroscopy shows grains that are presumably $CrO_2$ grains with interconnecting regions that are additive rich regions. Percolation between grains is achieved by doping up to 3–8% additive.

Figure 2:
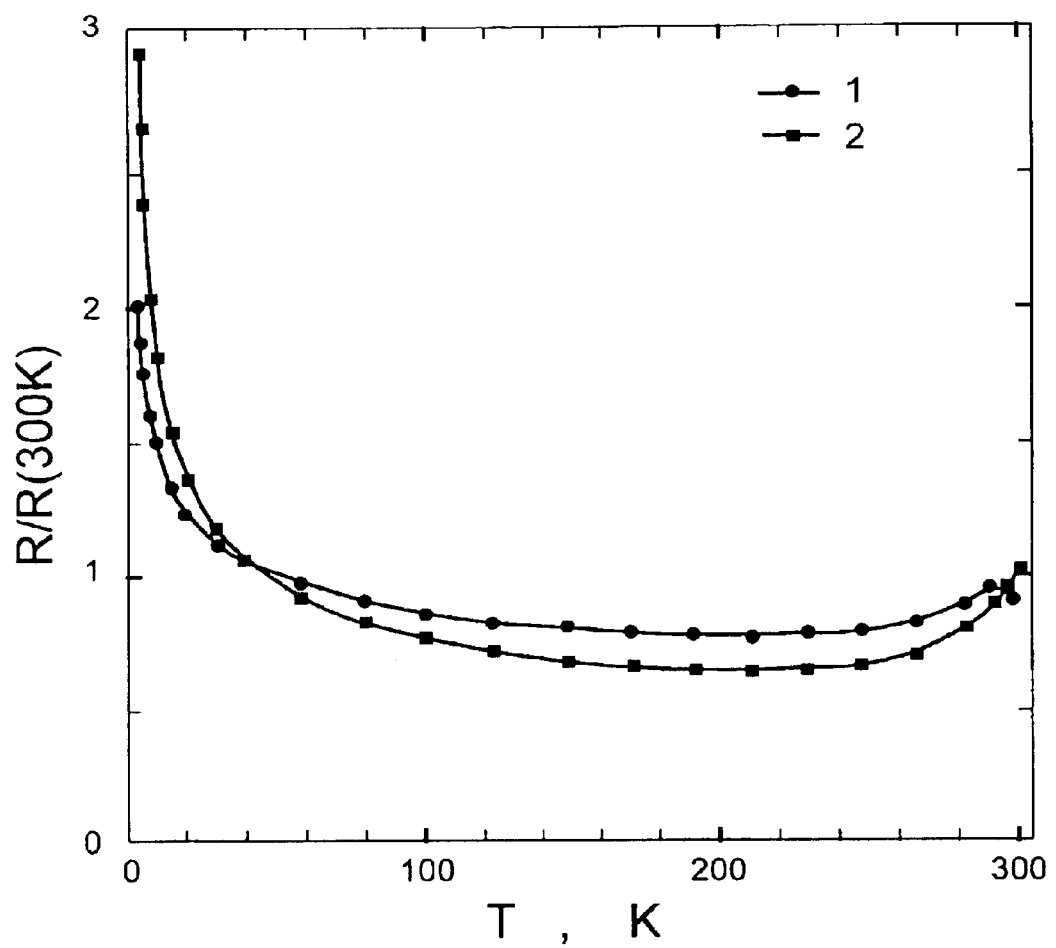
FIG. 2 depicts the resistance versus temperature plot.

FIG. 2 shows the plot of normalized resistance versus temperature plot for the $CrO_2$ polymer blend with and without the application of an external magnetic field. Note the sharp decrease in resistance at low temperatures below 10° K. The drop in resistance arises out of inter-grain tunneling when two moments of neighboring grains are forced to align by applying an external magnetic field.

Figure 3B:
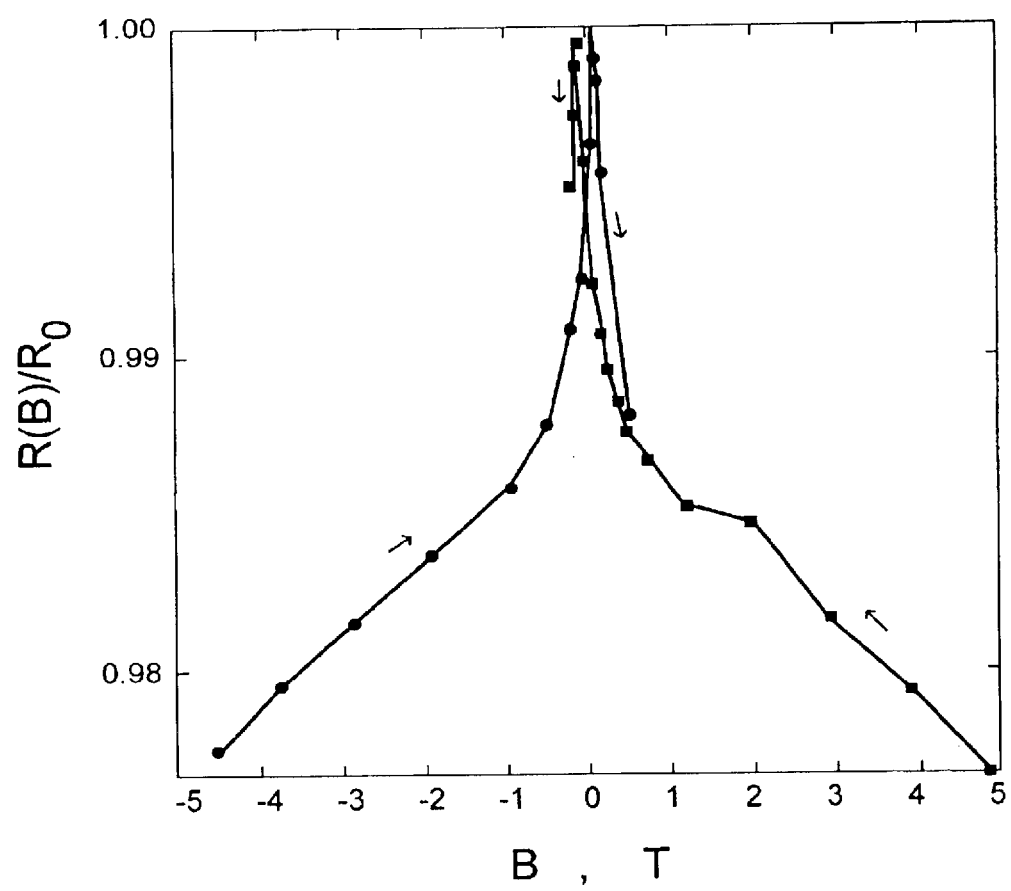
FIGS. 3(a–c) depicts the magneto-resistive property of the material at different temperatures.
Figure 3C:
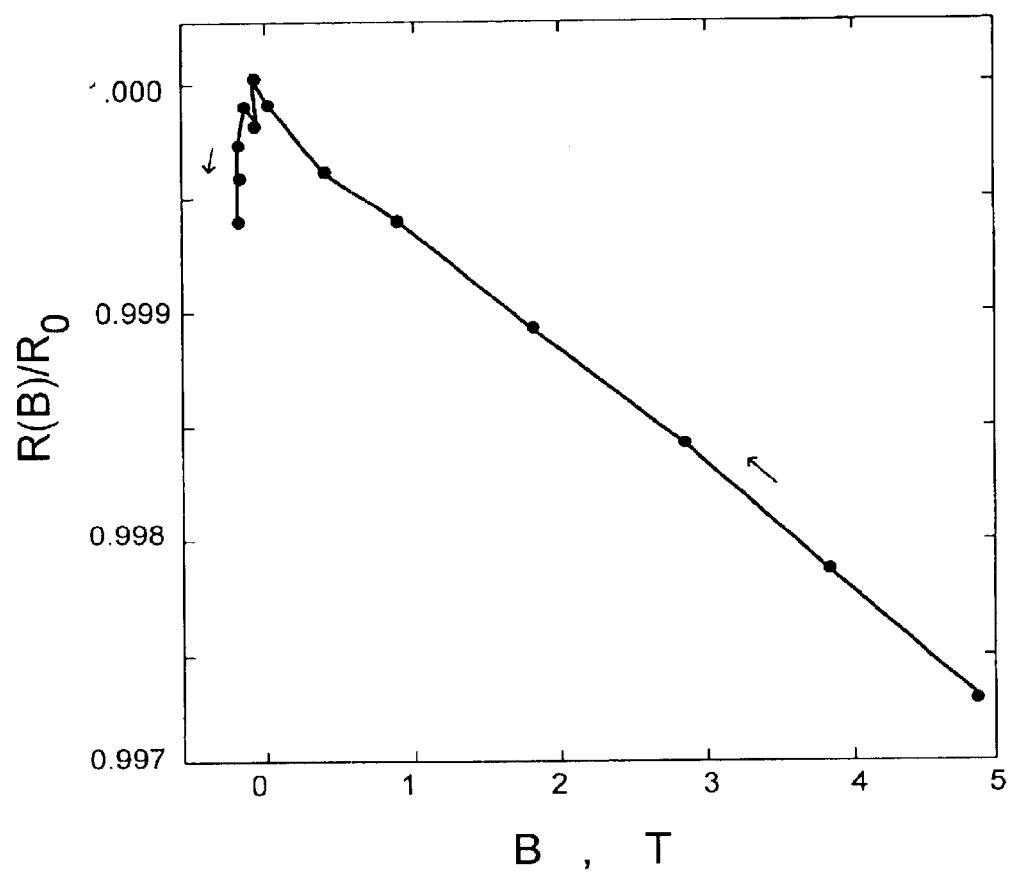

FIGS. 3(a–c) show plots of magneto-resistance at different temperatures. The field dependence of resistance is more pronounced at temperatures below 4° K and the percentage of magneto-resistance decreases with increasing temperatures. This is because the moments of each $CrO_2$ grain in the polymer blend is so randomly oriented that the external field is unable to force the grains to orient parallel to each other. As a result there is no substantial change in the resistance. However, at low temperatures, inter grain tunneling shows drastic change in resistance as a function of magnetic field.

EXAMPLES

Example 1

4% of the carbon black as additive and 16% of $CrO_2$ and 80% of low density polyethylene were mixed together in a agate mortar pestle and the intimately mixed powder was compacted together as a pellet using a die of 5 mm diameter. The powder was compacted to a thickness of about 4 mm thickness by applying a pressure of about 3 Tonnes. The pellets so obtained were placed in a preheated die heated at 95° C. The die was closed and placed in a hydraulic press and a uni-axial pressure of about 5 Tonnes was applied. The polymer composite melts at the applied pressure and temperature to form a blend, which is circular in shape and having a thickness of about 1 mm, forming the basis for preparing the $CrO_2$ blend with varying composition. The thickness and shape of the blends can be changed with the configuration of the die that is employed.

Example 2

5% of the carbon black as additive and 14% of $CrO_2$ and 81% of low density polyethylene were mixed together in a agate mortal and the intimately mixed powder was compacted together as a pellet using a die of 5 mm diameter. The powder was compacted to a thickness of about 4 mm thickness by applying a pressure of about 3 Tonnes. The pellets so obtained were placed in a preheated die heated at 95° C. The die was closed and placed in a hydraulic press and a uni-axial pressure of about 5 Tonnes was applied. The polymer composite melts at the applied pressure and temperature to form a blend, which is circular in shape and having a thickness of about 1 mm, forming the basis for preparing the $CrO_2$ blend with varying composition. The thickness and shape of the blends can be changed with the configuration of the die that is employed.

A rectangular portion of the blend was employed for electrical resistivity studies. Four probe contacts were made with electrolytic grade silver paint and insulated copper wire. A He Cryostat, Oxford instrument was employed for studying the resistance versus temperature plot. The samples were cooled at 4.2 k and the resistance as a function of applied magnetic field 0 to 5 Tesla was measured at different temperatures.

The subject application is a mere statement of invention, where various modifications and alterations are possible without deviating from the scope of the invention, hence the present application should not be construed to restrict the scope of the invention.

I claim:

1. A magneto-resistive $CrO_2$ polymer composite film for use in magnetic storage devices comprising:

88%–93% w/w of low density polyethylene;

5–8% w/w of $CrO_2$; and

2–4% w/w of carbon black.

2. A magneto-resistive $CrO_2$ polymer composite film as claimed in claim 1, wherein the said $CrO_2$ is in the form of powder.

* * * * *

UNITED STATES PATENT AND TRADEMARK OFFICE
CERTIFICATE OF CORRECTION

PATENT NO. : 6,793,841 B2  
DATED : September 21, 2004  
INVENTOR(S) : Solomon Sundar Manoharan Page 1 of 1

It is certified that error appears in the above-identified patent and that said Letters Patent is hereby corrected as shown below:

<u>Title page,</u>
Item [30], Foreign Application Priority Data, "934/00" should read -- 934/DEL/00 --.

Signed and Sealed this

Twenty-first day of December, 2004

JON W. DUDAS
*Director of the United States Patent and Trademark Office*